United States Patent
Seong

(10) Patent No.: US 10,210,093 B2
(45) Date of Patent: Feb. 19, 2019

(54) MEMORY DEVICE SUPPORTING BOTH CACHE MODE AND MEMORY MODE, AND OPERATING METHOD OF THE SAME

(71) Applicant: Samsung Electronics Co., Ltd., Suwon-Si, Gyeonggi-Do (KR)

(72) Inventor: Nak Hee Seong, Gwacheon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 749 days.

(21) Appl. No.: 14/478,039

(22) Filed: Sep. 5, 2014

(65) Prior Publication Data
US 2015/0161052 A1 Jun. 11, 2015

(30) Foreign Application Priority Data
Dec. 9, 2013 (KR) .................. 10-2013-0152550

(51) Int. Cl.
*G06F 12/08* (2016.01)
*G06F 12/0895* (2016.01)
*G06F 12/0802* (2016.01)

(52) U.S. Cl.
CPC ...... *G06F 12/0895* (2013.01); *G06F 12/0802* (2013.01); *G06F 12/08* (2013.01)

(58) Field of Classification Search
CPC .............................. G06F 12/08; G06F 12/0802
See application file for complete search history.

(56) References Cited

U.S. PATENT DOCUMENTS

| | | | |
|---|---|---|---|
| 5,410,669 A * | 4/1995 | Biggs ................. | G06F 12/0802 711/118 |
| 5,586,293 A * | 12/1996 | Baron ................. | G06F 12/0802 710/14 |
| 6,516,387 B1 | 2/2003 | Auracher | |
| 7,080,128 B2 | 7/2006 | Sakaguchi | |
| 7,234,040 B2 | 6/2007 | Berg et al. | |
| 7,260,682 B2 | 8/2007 | Lesot et al. | |
| 7,370,148 B2 | 5/2008 | Ikeuchi et al. | |
| 7,546,437 B2 | 6/2009 | Lesot et al. | |
| 7,558,937 B2 | 7/2009 | Nakashima et al. | |
| 7,644,239 B2 | 1/2010 | Ergan et al. | |
| 7,899,993 B2 | 3/2011 | Knoth | |
| 2002/0062409 A1* | 5/2002 | Lasserre ................. | G06F 1/206 710/22 |
| 2006/0168390 A1* | 7/2006 | Speier ................. | G06F 12/0802 711/5 |
| 2008/0005504 A1 | 1/2008 | Barnes et al. | |
| 2012/0210070 A1 | 8/2012 | Blake et al. | |
| 2013/0238859 A1* | 9/2013 | Han ..................... | G06F 12/0802 711/125 |

FOREIGN PATENT DOCUMENTS

JP 08006858 A 1/1996

* cited by examiner

*Primary Examiner* — Charles Rones
*Assistant Examiner* — Tian-Pong Chang
(74) *Attorney, Agent, or Firm* — Harness, Dickey & Pierce, P.L.C.

(57) ABSTRACT

A method of operating a memory device that includes at least one sub-memory supporting a cache mode and a memory mode, the method including receiving a mode change signal instructing the memory device to change an operation mode of the at least one sub-memory from the cache mode to the memory mode; and changing the operation mode of the at least one sub-memory from the cache mode to the memory mode without flushing the at least one sub-memory, according to the mode change signal.

18 Claims, 11 Drawing Sheets

FIG. 10

| WM | M | Access type | |
|----|---|---|---|
|    |   | Cache access | Memory Access |
| 0 | 0 | Allowed. | Fault. |
| 0 | 1 | Allowed.<br>"V" should be 0.<br>"M" is changed to 0. | Fault |
| 1 | 0 | Allowed or Miss.<br>Allocation is unallowable. | Allowed.<br>When "V"=1 and "D"=1, original data should be written back to memory.<br>"M" is changed to 1. |
| 1 | 1 | Miss.<br>Allocation is unallowable. | Allowed. |

MEMORY DEVICE SUPPORTING BOTH CACHE MODE AND MEMORY MODE, AND OPERATING METHOD OF THE SAME

CROSS-REFERENCE TO RELATED APPLICATIONS

This application claims the benefit of Korean Patent Application No. 10-2013-0152550, filed on Dec. 9, 2013, in the Korean Intellectual Property Office, the disclosure of which is incorporated herein in its entirety by reference.

BACKGROUND

At least some example embodiments of the inventive concepts relate to a memory device supporting both a cache mode and a memory mode, and a method of operating the same.

In a computer system, a cache is used to reduce degradation in the performance of the computer system, caused by long access latency of a main memory. The cache includes a tag array and a data array. Among these arrays, the data array occupies a great part of the cache. In a cache mode, the data array may be used as a cache of the main memory.

However, in particular cases, it is more efficient to use the data array in a memory mode (or a scratch pad mode) than in the cache mode. For example, when the size of a dynamic memory working set of an application is far greater than the capacity of the cache, a specific page with high locality may be allocated using the data array as a mapping space of a memory.

If the data array supports both the cache mode and the memory mode, intervention of software is needed to maintain data coherency when a mode of the data array is changed. For example, when the data array is switched from the cache mode to the memory mode, all of dirty cache lines of the data array should be flushed to the main memory, thereby increasing latency for the mode change.

SUMMARY

According to an aspect of at least one example embodiment of the inventive concepts, there is provided a method of operating a memory device which includes at least one sub-memory supporting a cache mode and a memory mode, the method including receiving a mode change signal instructing the memory device to change operation mode of the at least one sub-memory from the cache mode to the memory mode; and changing the operation mode of the at least one sub-memory from the cache mode to the memory mode without flushing the at least one sub-memory, according to the mode change signal.

The memory device may be an n-way set-associative cache, and the at least one sub-memory is at least one way of the memory device.

The at least one sub-memory may include an operation mode bit representing the operation mode of the at least one sub-memory, a plurality of memory lines, and a plurality of line mode bits representing operation modes of the plurality of memory lines, respectively.

Each of the plurality of line mode bits may be a valid bit representing whether a corresponding memory line among the plurality of memory lines is valid.

The operation mode bit may change from a first logic level to a second logic level according to the mode change signal.

If a transaction corresponding to one of the plurality of memory lines accesses the at least one sub-memory, the method may further include determining an access type of the transaction according to an address of the transaction.

If a transaction corresponding to one of the plurality of memory lines accesses the at least one sub-memory, the method may further include operating the at least one sub-memory in the cache mode when the operation mode bit and a line mode bit corresponding to the transaction are in a first logic level, and operating the at least one sub-memory in the memory mode when the operation mode bit and the line mode bit corresponding to the transaction are in a second logic level.

If a transaction corresponding to one of the plurality of memory lines accesses the at least one sub-memory, the operation mode bit is in a first logic level, and a line mode bit corresponding to the transaction is in a second logic level, the method may further include changing the line mode bit corresponding to the transaction to the first logic level when the transaction is a cache access, and generating a page fault when the transaction is a memory access.

If a transaction corresponding to one of the plurality of memory lines accesses the at least one sub-memory, the operation mode bit is in a second logic level, and a line mode bit corresponding to the transaction is in a first logic level, the method may further include not allowing accessing of the transaction or handling as a cache miss when the transaction is a cache access, and flushing a memory line corresponding to the transaction based on a valid bit corresponding to the transaction and a dirty bit and changing a line mode bit corresponding to the transaction to the second logic level when the transaction is a memory access.

According to another aspect of at least one example embodiment of the inventive concepts, there is provided a memory device including a memory array and a controller. The memory array includes at least one sub-memory. The at least one sub-memory includes an operation mode bit representing an operation mode of the at least one sub-memory; a plurality of memory lines; and a plurality of line mode bits representing operation modes of the plurality of memory lines, respectively. The controller is configured to receive a transaction accessing the at least one sub-memory, and control an operation of the at least one sub-memory, based on the operation mode bit, a line mode bit corresponding to the transaction, and an access type of the transaction.

The controller may be a finite state machine (FSM).

The memory device may be an n-way set-associative cache, and the at least one sub-memory may be at least one way of the memory device.

Each of the plurality of line mode bits may be a valid bit representing whether a corresponding memory line among the plurality of memory lines is valid.

The controller may determine an access type of the transaction based on an address of the transaction.

According to another aspect of at least one example embodiment of the inventive concepts, there is provided an electronic system including at least one module; the memory device; and a central processing unit (CPU) configured to control the at least one module and the memory device. When the at least one sub-memory operates in a memory mode, the at least one sub-memory is used only for the at least one module.

At least some example embodiments of the inventive concepts provide a method of operating a memory device which includes a sub-memory includes receiving a mode change signal instructing the memory device to change an operation mode of the sub-memory from a cache mode to a memory mode, the cache mode being a mode in which the sub-memory functions as a cache of a main memory, the memory mode being a mode in which the sub-memory functions as a scratchpad memory, the sub-memory storing cache data; and changing, in response to the mode change signal, the operation mode of the sub-memory from the cache mode to the memory mode, the operation mode being changed without flushing the cache data stored in the sub-memory to the main memory.

The method may further include receiving a transaction identifying a location of the cache data while the operation mode of the sub-memory is set to the memory mode; determining whether the transaction is a memory mode access transaction or a cache mode access transaction; and when the transaction is a memory mode access transaction, flushing the cache data stored in the sub-memory to the main memory.

The method may further include operating the sub-memory as one way of N ways of an N-way set associative cache, when the operation mode is set to the cache mode.

The method may further include operating the sub-memory as a memory space to which a memory working set of at least one of an application is mapped, when the operation mode is set to the memory mode.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 10 is a table illustrating an operation of a controller of FIG. 1; and

DETAILED DESCRIPTION OF THE EMBODIMENTS

Figure 1:
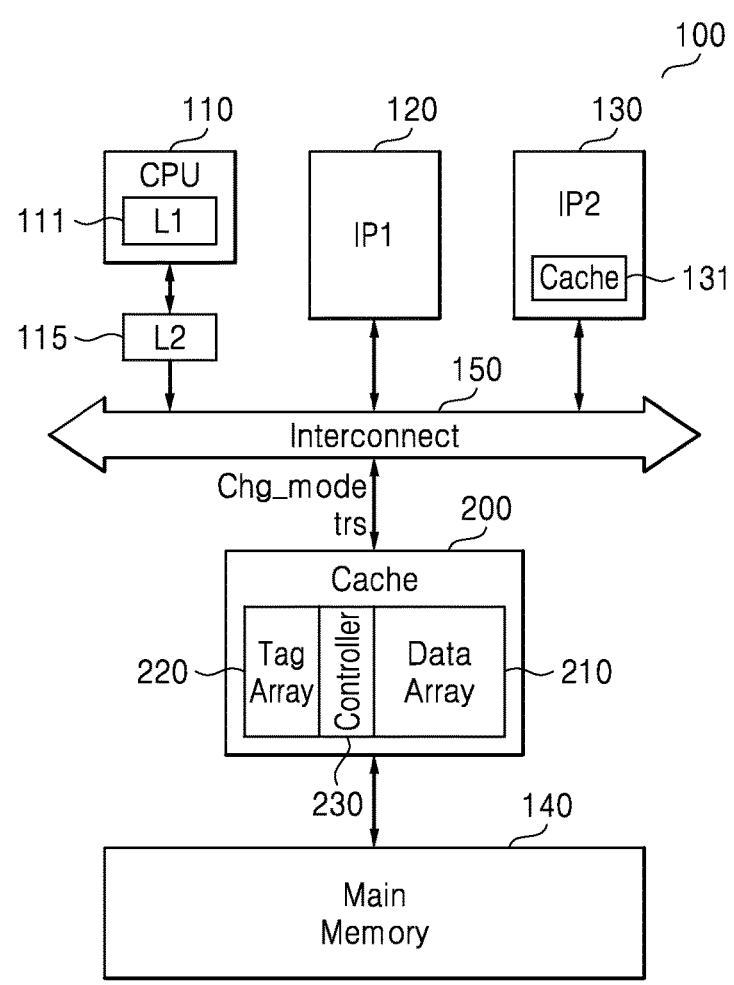
FIG. 1 is a block diagram of an electronic system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an electronic system 100 according to at least one example embodiment of the inventive concepts.

Referring to FIG. 1, the electronic system 100 may be embodied as a mobile phone, a smart phone, a tablet personal computer (PC), a personal digital assistant (PDA), an enterprise digital assistant (EDA), a digital still camera, a digital video camera, a portable multimedia player (PMP), a personal/portable navigation device (PND), a handheld game console, or a handheld device such as an e-book.

The electronic system 100 may include a central processing unit (CPU) 110, a level-2 (L2) cache 115, a first module 120, a second module 130, a main memory 140, a system bus 150, and a memory cache 200.

The CPU 100 which may be also referred to as a processor may process or execute programs and/or data stored in the main memory 140. For example, the CPU 110 may process or execute the programs and/or the data, in response to a clock signal output from a clock signal generator (not shown).

The CPU 100 may be embodied as a multi-core processor. The multi-core processor is a single computing component including two or more independent actual processors (called 'cores') configured to read and execute program instructions. The multi-core processor is capable of simultaneously driving a plurality of accelerators, and thus a data processing system including the multi-core processor is capable of performing multi-acceleration.

The CPU 110 may include a level-1 (L1) cache 111. According to at least one example embodiment, the L1 cache 111 may be disposed on the same chip as the CPU 110.

The L2 cache 115 may be installed on either a chip separated from the CPU 110 or an expansion card, and connected between the CPU 110 and the system bus 150.

The L1 cache 111 and the L2 cache 115 may be connected in series. The L1 cache 111 may be embodied as a store-in cache or a write-through cache. In contrast, the L2 cache 115 that has a large size and operates at low speeds may be embodied as a write-back cache. According to at least one example embodiment, the L2 cache may have a larger data capacity than the L1 cache.

According to at least one example embodiment of the inventive concepts, the L1 cache 111 and the L2 cache 115 may be disposed on the same chip as the CPU 110, and an additional level-3 (L3) cache (not shown) may be connected between the CPU 110 and the system bus 150.

Each of the first module 120 and the second module 130 may be one of various intellectual properties (IPs) controlled by the CPU 110. As used herein, the term 'IP' means a circuit, a logic including an arrangement of circuit elements, or a combination thereof that may be integrated on the electronic system 100. Code may also be stored in the circuit or the logic.

Examples of an IP may include a graphic processing unit (GPU), multi-format codec (MFC), a video module (e.g., a camera interface, a Joint Photographic Experts Group (JPEG) processor, a video processor, a mixer, etc.), an audio system, a driver, a display driver, a volatile memory device, a non-volatile memory device, a memory controller, a cache memory, a serial port, a system timer, a watch dog timer, an analog-to-digital converter, etc.

In one embodiment, a cache memory may be included in an IP. For example, an internal IP cache 131 may be included in the second module 130 to increase an operating speed of the second module 130.

The main memory 140 may store instructions and data to be executed by the CPU 110. The main memory 140 may be embodied as a volatile memory device or a non-volatile memory device.

The volatile memory device may be embodied as a dynamic random access memory (DRAM), a static random access memory (SRAM), a thyristor RAM (T-RAM), a zero capacitor RAM (Z-RAM), or a twin transistor RAM (TTRAM).

The non-volatile memory device may be embodied as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (nFGm), holographic memory, a molecular electronics memory device, or an insulator resistance change memory.

The memory cache (or system cache) 200 may be connected between the system bus 150 and the main memory 140. The memory cache 200 may receive a mode change signal chg_mode and a transaction trs from the system bus 150.

In one embodiment, the memory cache 200 may be embodied as a volatile memory device, e.g., an SRAM.

The memory cache 200 may include a data array 210, a tag array 220, and a controller 230.

The controller 230 may be embodied as a finite state machine (FSM).

At least one example embodiment of the inventive concepts will now be described with reference to the memory cache 200. However, since the L1 cache 111, the L2 cache 115, and the internal IP cache 131 may have the same structure as the memory cache 200, according to at least one example embodiment, the features described herein with respect to the structure an method of operating the memory cache 200 are also applicable to the structures of and methods of operating the L1 cache 111, the L2 cache 115, and the internal IP cache 131.

Figure 2:
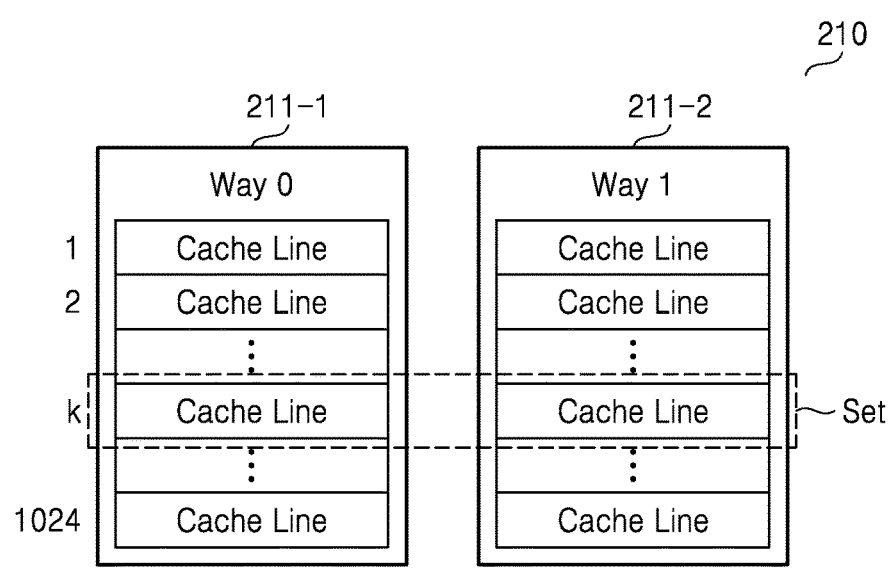
FIG. 2 is a diagram illustrating a data array of FIG. 1 according to at least one example embodiment of the inventive concepts.
Figure 3:
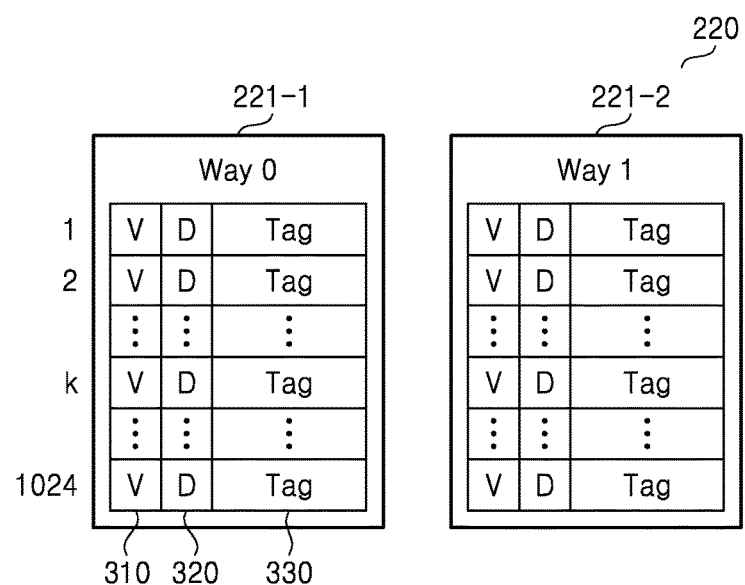
FIG. 3 is a diagram illustrating a tag array of FIG. 1 according to at least one example embodiment of the inventive concepts.

FIG. 2 is a diagram illustrating the data array 210 of FIG. 1 according to at least one example embodiment of the inventive concepts. FIG. 3 is a diagram illustrating the tag array 220 of FIG. 1 according to at least one example embodiment of the inventive concepts.

Referring to FIGS. 1 to 3, the memory cache 200 may be embodied as an n-way set-associative cache. In this case, the memory cache 200 may include n sub-memories (or called 'n ways'). Here, 'n' denotes an integer that is equal to or greater than '2'. Each of the n sub-memories may include a sub-data array and a sub-tag array corresponding thereto.

Each of the n sub-memories may operate in a cache mode or a memory mode (or a scratch pad mode). When a sub-memory operates in the memory mode, the sub-memory may be used only for a particular IP, e.g., the first module 120 or the second module 130.

It is assumed that n=2 and the number of cache lines of each of the n sub-memories is 1024.

The data array 210 may include a first sub-data array 211-1 and a second sub-data array 211-2.

In one embodiment, each of the first and second sub-data arrays 211-1 and 211-2 may include 1024 cache lines for storing data, and each of the 1024 cache lines may be 64 bytes. However, at least some example embodiments of the inventive concepts are not limited thereto.

The 1024 cache lines may be selected using indexes '1' to '1024', respectively. The cache lines of the respective sub-data arrays 211-1 and 211-2 selected using the same index (e.g., an integer k that is equal to or greater than and less than or equal to '1024') may form one set together.

Each of the sub-data arrays 211-1 and 211-2 may be used in the cache mode or the memory mode. In the cache mode, the sub-data arrays 211-1 and 211-2 may be used as caches of the main memory 140. In the memory mode, the sub-data arrays 211-1 and 211-2 may be used as scratch pad memories.

The tag array 220 may include a first sub-tag array 221-1 and a second sub-tag array 221-2.

Each of the sub-tag arrays 221-1 and 221-2 may include tag addresses 330, the total number of which is the same as the number of the cache lines of each of the first and second sub-data arrays 211-1 and 211-2, e.g., 1024 tag addresses 330.

Each of the sub-tag arrays 221-1 and 221-2 may further include valid bits 310 and dirty bits 320 corresponding to the tag addresses 330.

The valid bits 310 represent whether data stored in the cache lines corresponding to the tag addresses 330 are valid or not in the cache mode. For example, data in a cache immediately after a power-on operation and before cache data storage operation may be invalid data. The dirty bits 320 represent whether the data stored in the cache lines are different from data stored in the main memory 140 or not.

It will be hereinafter assumed that a first sub-memory includes the first sub-data array 211-1 and the first sub-tag array 221-1, a second sub-memory includes the second sub-data array 211-2 and the second sub-tag array 221-2, and a transaction trs accesses the first sub-memory.

Figure 4:
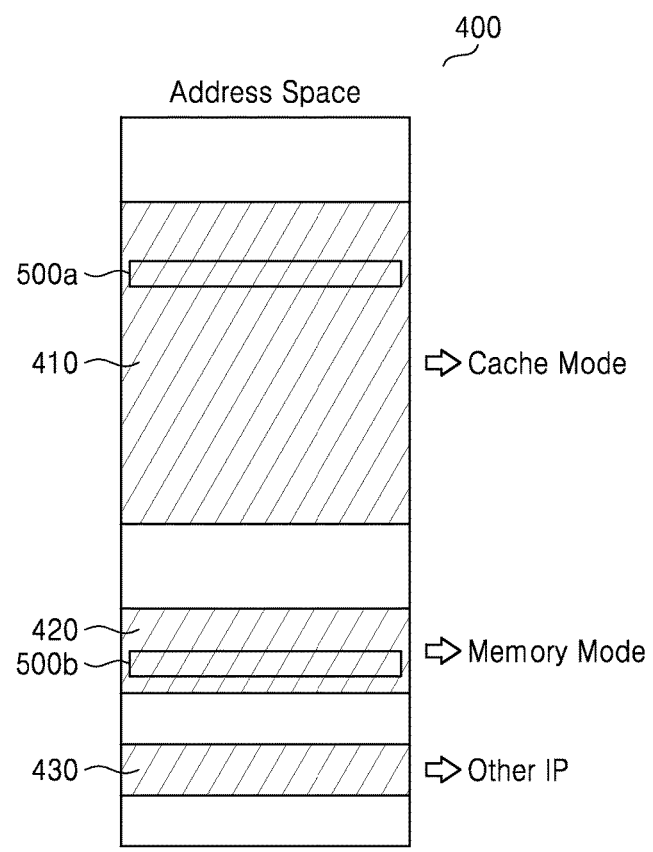
FIG. 4 is a diagram illustrating an address space according to at least one example embodiment of the inventive concepts.

FIG. 4 is a diagram illustrating an address space 400 according to at least one example embodiment of the inventive concepts.

Referring to FIGS. 1 and 4, the CPU 110, the first module 120, or the second module 130 may transmit a memory access request, i.e., a transaction trs, to the memory cache 200 via the system bus 150. Each of transactions trs may include one of addresses in the address space 400.

The address space 400 may include a first region 410, a second region 420, and a third region 430.

The first region 410 may be allocated to the main memory 140, the second region 420 may be allocated to a scratch pad memory, and the third region 430 may be allocated to a particular IP (e.g., the first module 120 or the second module 130).

The system bus 150 may determine the access type of the transaction trs according to the address of the transaction trs.

When the transaction trs includes a first address 500a in the first region 410, the system bus 150 may cache-access the memory cache 200, based on a result of decoding the first address 500a. As used herein, the term cache-access refers to accessing a cache memory in a cache mode.

When the transaction trs includes a second address 500b in the second region 420, the system bus 150 may memory-access the memory cache 200, based on a result of decoding the second address 500b. As used herein, the term memory-access refers to accessing a cache memory in a memory or scratch pad mode.

Figure 5:
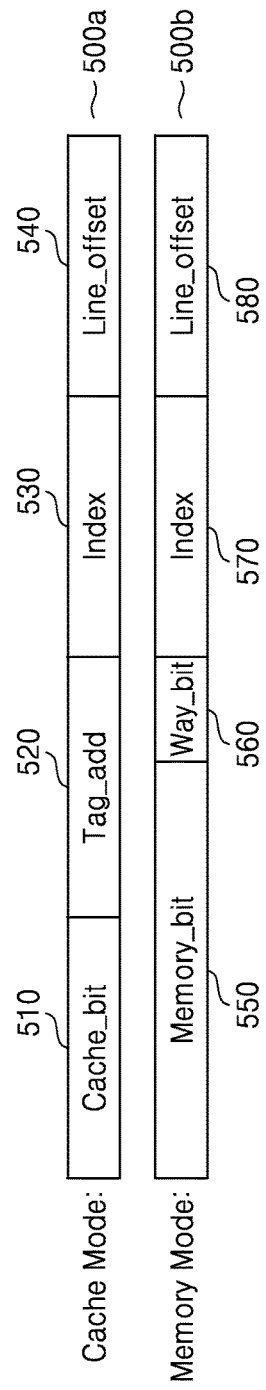
FIG. 5 illustrates addresses in the address space of FIG. 4.

FIG. 5 illustrates addresses in the address space 400 of FIG. 4.

Referring to FIGS. 1, 2, 4, and 5, the first address 500a may include a cache_bit 510, a tag_add 520, an index 530, and a line_offset 540.

The second address 500b may include a memory_bit 550, a way_bit 560, an index, 570, and a line_offset 580.

When the cache_bit 510 of the first address 500a is a specific bit, the system bus 150 may cache-access the memory cache 200, based on the tag_address 520, the index 530, and the line_offset 540.

When the memory_bit 550 of the second address 500b is a specific bit, the system bus 150 may memory-access the first sub-data array 211-1 corresponding to a way (first sub-memory) of the memory cache 200 indicated by the way_bit 560, based on the index 530 and the line_offset 540.

Figure 6:
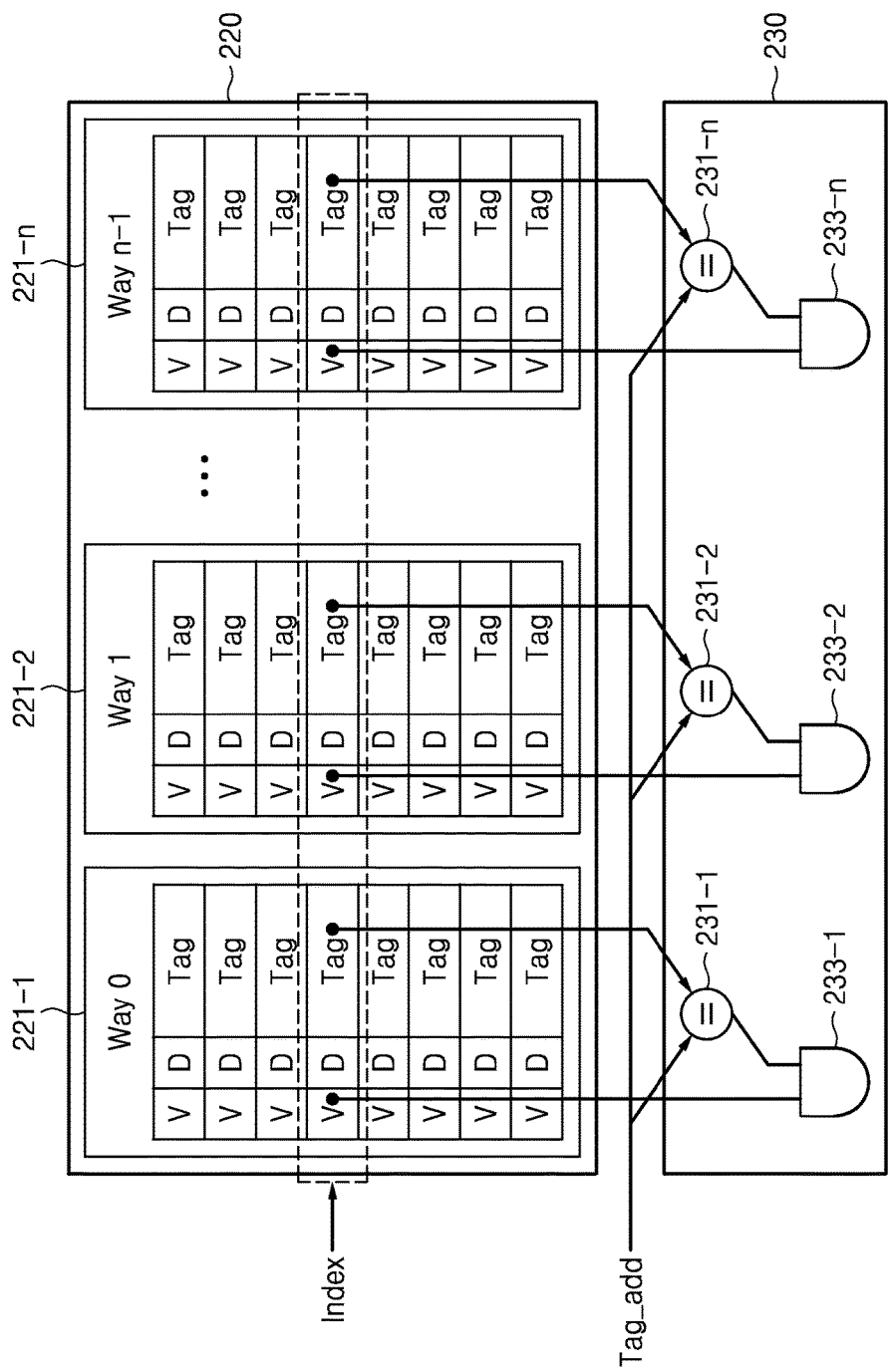
FIG. 6 is a diagram illustrating an operation of a memory cache of FIG. 1 when the memory cache is cache-accessed.

FIG. 6 is a diagram illustrating an operation of the memory cache 200 of FIG. 1 when the memory cache 200 is cache-accessed.

Referring to FIGS. 1, 5, and 6, it is assumed that n ways operate in the cache mode and n sub-tag arrays 221-1 to 221-n correspond to the n ways.

The controller 230 may include n comparators 231-1 to 231-n and n operation units 233-1 to 233-n.

The comparators 231-1 to 231-n compare tag addresses of the respective sub-tag arrays 221-1 to 221-n corresponding to the index 530 of the first address 500a with the tag_address 520 of the first address 500a so as to determine whether the tag addresses are the same as the tag_address 520.

When the comparators 231-1 to 231-n determine that the tag address is the same as the tag_address 520 and valid bit V corresponding to the tag address indicate 'valid', the operation units 233-1 to 233-n may determine that a cache hit occurs. Then, the controller 230 may select data corresponding to the line_offset 540 in a cache line corresponding to the index 530 in the corresponding sub-data array 211.

Figure 7:
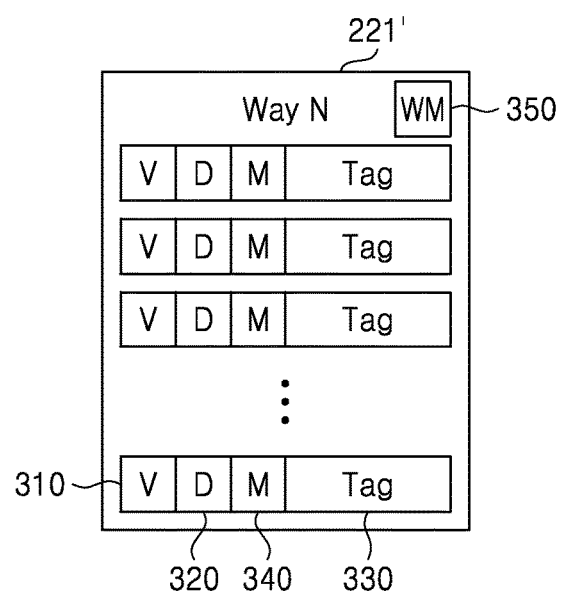
FIG. 7 is a diagram illustrating another embodiment of a sub-tag array of FIG. 3 according to at least one example embodiment of the inventive concepts.

FIG. 7 is a diagram illustrating a sub-tag array 221' that is another embodiment of the sub-tag array 221-1 or 221-2 of FIG. 3.

Referring to FIGS. 1, 2, 3, and 7, the sub-tag array 221' may be included in each ways, and may include a valid bit 310, a dirty bit 320, a tag address 330, a line mode bit 340, and a way mode bit 350. The structure of the sub-tag array 221' of FIG. 7 is substantially the same as that of the sub-tag array 221-1 or 221-2 of FIG. 3 and will be thus described focusing on the differences from the sub-tag array 221-1 or 221-2 below for convenience of explanation.

The line mode bit 340 may represent an operation mode of a cache line corresponding thereto.

The way mode bit 350 may represent an operation mode of a sub-memory corresponding thereto.

The line mode bit 340 and the way mode bit 350 may represent the cache mode when they are in a first logic level, e.g., when they are each, for example, '0', and represent the memory mode when they are in a second logic level, e.g., when they are each, for example. '1', but at least some example embodiments of the inventive concepts are not limited thereto.

The way mode bit 350 may be switched from the first logic level to the second logic level according to a mode change signal chg_mode.

Figure 8:
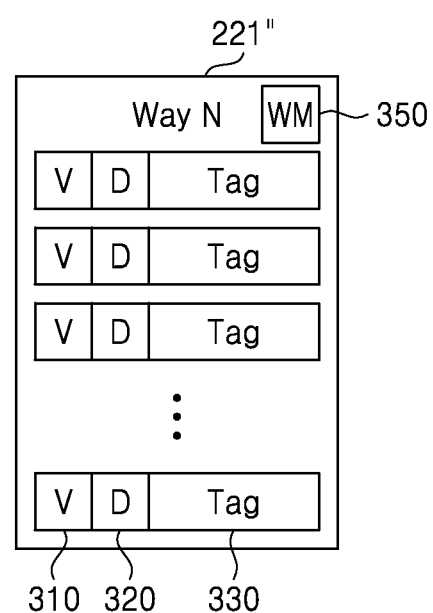
FIG. 8 is a diagram illustrating another embodiment of the sub-tag array of FIG. 3 according to at least one example embodiment of the inventive concepts.

FIG. 8 is a diagram illustrating a sub-tag array 221" that is another embodiment of the sub-tag array 221-1 or 221-2 of FIG. 3.

Referring to FIGS. 7 and 8, the sub-tag array 221" may be included in each ways, and include a valid bit 310, a dirty bit 320, a tag address 330, and a way mode bit 350. The structure of the sub-tag array 221" of FIG. 8 is substantially the same as that of the sub-tag array 221' of FIG. 7 and will be thus described focusing on the differences from the sub-tag array 221' below for convenience of explanation.

The sub-tag array 221" may not include a line mode bit. In this case, the valid bit 310 may represent an operation mode of a cache line corresponding thereto.

For example, a logic level obtained by inverting the valid bit 310 may correspond to the line mode bit 340. It may be determined that a cache line corresponding to the valid bit 310 is in the memory mode when the valid bit 310 is in the first logic level, and is in the cache mode when the valid bit 310 is in the second logic level.

In another embodiment, the tag array 220 may include the sub-tag arrays 221-1 and 221-2 of FIG. 3, and the data array 211 may store the way mode bit 350 or data corresponding to the way mode bit 350.

Figure 9:
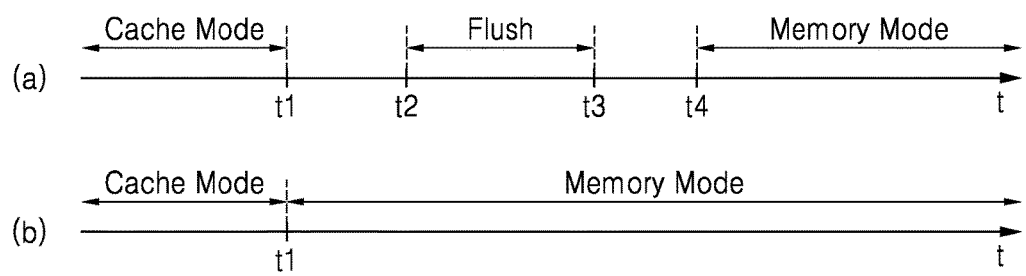
FIG. 9 is a timing diagram of changing a mode of a memory cache from a cache mode to a memory mode.

FIG. 9 is a timing diagram of switching of a memory cache 200 from the cache mode to the memory mode.

Referring to FIGS. 1 and 9(a), software executed by the CPU 110 (hereinafter referred to as 'S/W') may cause the CPU to operate the first sub-memory in the cache mode, and transmit a mode change command related to the first sub-memory to the memory cache 200 (hereinafter referred to as 'H/W') at a point of time t1 when a scratch pad memory is determined to be needed.

The H/W may flush a first sub-memory from a point of time t2 to a point of time t3, and inform the CPU executing the S/W of completion of the flushing of the first sub-memory when the flushing of the first sub-memory is completed.

The CPU executing the S/W may change a mode of the first sub-memory to the memory mode and operate the first sub-memory in the memory mode starting from a point of time t4 when the H/W completes the flushing of the first sub-memory.

When a mode change is performed according to the process described above, intervention of the CPU executing the S/W occurs frequently and the first sub-memory should be prevented from being accessed during the mode change, i.e., in a time period between the point of time t1 and the point of time t4. Also, cache lines should be sequentially flushed, thereby increasing latency for the mode change.

Referring to FIGS. 1 and 9(b), the CPU 110 may transmit the mode change signal chg_mode to the memory cache 200 at a point of time t1 to change the way mode bit 350 of the sub-tag array 221 of the first sub-memory from a first logic level to a second logic level.

Then, data coherence is maintained using H/W while switching the first sub-memory to the memory mode to operate in the memory mode.

Thus, according to at least one example embodiment of the inventive concepts, an operation mode of a sub-memory is changed without flushing the first sub-memory according to the mode change signal ch_mode, thereby reducing overhead when the operation mode is changed.

FIG. 10 is a table illustrating an operation of the controller 230 of FIG. 1.

Referring to FIGS. 1, 7, and 10, the transaction trs may access a first sub-memory. The controller 230 may receive the transaction trs and control an operation of the memory cache 200, based on the way mode bit 350 of the first sub-memory, the line mode bit 340 corresponding to an index in the address of the transaction trs, and the access type of the transaction trs.

When the way mode bit 350 and the line mode bit 340 are in a first logic level, e.g., '0', the first sub-memory operates in the cache mode.

Thus, the controller 230 allows accessing to the first sub-memory when the transaction trs is a cache access, and generates a page fault when the transaction trs is a memory access.

When the way mode hit 350 is in the first logic level, e.g., '0', and the line mode bit 340 is in a second logic level, e.g., '1', the controller 230 determines whether the transaction trs is the cache access or the memory access.

When the transaction trs is the cache access, it means that the first sub-memory operated in the memory mode, and the transaction trs is a first cache-access to a corresponding cache line after the first sub-memory is switched to the cache mode. Thus, the valid bit 310 corresponding to the transaction trs is in the first logic level, e.g., '0'. The controller 230 changes the line mode bit 340 to the first logic level, e.g., '0'.

The controller 230 generates a page fault when the transaction trs is the memory access.

When the way mode bit 350 is in the second logic level, e.g., '1', and the line mode bit 340 is in the first logic level, e.g., '0', the controller 230 determines whether the transaction trs is the cache access or the memory access.

When the transaction trs is the cache access, the first sub-memory is switched to the memory mode but the cache line corresponding to the transaction trs has not yet been used in the memory mode.

Thus, the controller 230 may not allow accessing of the transaction trs or handle as a cache miss.

In another embodiment, the controller 230 may allow the cache access when the valid bit 310 corresponding to the transaction trs is in the second logic level, e.g., and a tag match occurs. In this case, the controller 230 may not allow allocation of a new cache line.

When the transaction trs is the memory access, it means that first memory access is performed on a cache line corresponding to the transaction trs after the operation mode of the first sub-memory is switched to the memory mode. Thus, up-to-date data may be stored in the corresponding cache line.

The controller 330 may flush the cache line corresponding to the transaction trs, based on the valid bit 310 and the dirty bit 320 corresponding to the transaction trs. For example, when both the valid bit 310 and the dirty bit 320 are in the second logic level, e.g., '1', the controller 330 may writeback data of the cache line to the main memory 140 and change the valid bit 310 to the first logic level, e.g., '0'. Then, the line mode bit 340 corresponding to the transaction trs may be changed to the second logic level.

When the way mode bit 350 and the line mode bit 340 are in the second logic level, e.g., '1', the first sub-memory operates in the memory mode.

Thus, the controller 230 generates a cache miss and does not allow allocation of a new cache line when the transaction trs is the cache access. The controller 230 allows accessing of the transaction trs when the transaction trs is the memory access.

Figure 11:
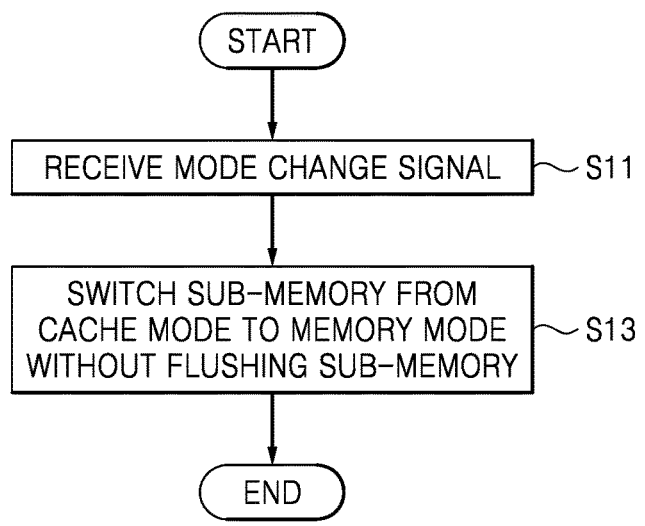
FIG. 11 is a flowchart of a method of operating a memory device according to at least one example embodiment of the inventive concepts.

FIG. 11 is a flowchart of a method of operating a memory device according to at least one example embodiment of the inventive concepts.

Referring to FIGS. 1 and 11, the memory cache 200 receives a mode change signal chg_mode instructing to change an operation mode of a sub-memory from the cache mode to the memory mode (operation S11).

Then, the memory cache 200 changes an operation mode of a sub-memory from the cache mode to the memory mode without flushing the sub-memory, according to the mode change signal chg_mode (operation S13).

According to the one or more example embodiments of the inventive concepts, overhead may decrease when an operation mode is switched between the cache mode and the memory mode, and data coherence may be dynamically maintained.

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a memory device which includes at least one sub-memory supporting a cache mode and a memory mode, the method comprising:
   receiving a mode change signal instructing the memory device to change an operation mode of the at least one sub-memory from the cache mode to the memory mode; and
   changing the operation mode of the at least one sub-memory from the cache mode to the memory mode without flushing the at least one sub-memory, according to the mode change signal,
   wherein the at least one sub-memory includes,
      an operation mode bit representing the operation mode of the at least one sub-memory; and
      a plurality of line mode bits representing operation modes of a plurality of memory lines, respectively, and
   wherein the method further comprises:
      when a transaction corresponding to one of the plurality of memory lines accesses the at least one sub-memory,
         operating the at least one sub-memory in the cache mode when both of the operation mode bit and a line mode bit corresponding to the transaction represent the cache mode, and
         operating the at least one sub-memory in the memory mode when both of the operation mode bit and the line mode bit corresponding to the transaction represent the memory mode.

2. The method of claim 1, wherein the memory device is an n-way set-associative cache, and the at least one sub-memory is at least one way of the memory device such that the changing the operation mode of the at least one sub-memory includes changing the operation mode of the at least one way of the memory device.

3. The method of claim 2,
   wherein the method further comprises:
      setting the operation mode bit in accordance with the operation mode of the at least one sub-memory; and
      setting the plurality of line mode bits in accordance with the operation modes of the plurality of memory lines.

4. The method of claim 3, wherein each of the plurality of line mode bits is a valid bit representing whether a corresponding memory line among the plurality of memory lines is valid such that the setting the plurality of line mode bits includes setting the plurality of valid bits in accordance with the operation modes of the plurality of memory lines.

5. The method of claim 3, further comprising:
   changing the operation mode bit from a first logic level to a second logic level according to the mode change signal.

6. The method of claim 3, further comprising:
   determining an access type of a first transaction according to an address of the first transaction, when the first transaction accesses the at least one sub-memory, the first transaction corresponding to one of the plurality of memory lines.

7. The method of claim 3, further comprising:
   when a transaction corresponding to one of the plurality of memory lines accesses the at least one sub-memory, the operation mode bit is in a first logic level, and a line mode bit corresponding to the transaction is in a second logic level,
      changing the line mode bit corresponding to the transaction to the first logic level when the transaction is a cache access, and generating a page fault when the transaction is a memory access.

8. The method of claim 3, further comprising:
   when a transaction corresponding to one of the plurality of memory lines accesses the at least one sub-memory, the operation mode bit is in a second logic level, and a line mode bit corresponding to the transaction is in a first logic level,
      not allowing accessing of the transaction or handling as a cache miss when the transaction is a cache access, and
      when the transaction is a memory access,
         flushing a memory line corresponding to the transaction based on a valid bit corresponding to the transaction and a dirty bit, and
         changing a line mode bit corresponding to the transaction to the second logic level.

9. A memory device comprising:
   a memory array comprising at least one sub-memory, the at least one sub-memory including,
      an operation mode bit representing an operation mode of the at least one sub-memory;
      a plurality of memory lines; and
      a plurality of line mode bits representing operation modes of the plurality of memory lines, respectively; and
   a controller configured to receive a transaction accessing the at least one sub-memory, and configured to control an operation of the at least one sub-memory, based on, the operation mode bit, a line mode bit corresponding to the transaction, and an access type of the transaction,
   wherein, for each memory line among the plurality of memory lines, the line mode bit representing the operation mode of the memory line indicates whether the memory line is in a cache mode or a memory mode, and
   wherein, when a transaction corresponding to one of the plurality of memory lines accesses the at least one sub-memory,
      the at least one sub-memory operates in the cache mode when both of the operation mode bit and a line mode bit corresponding to the transaction represent the cache mode, and
      the at least one sub-memory operates in the memory mode when both of the operation mode bit and the line mode bit corresponding to the transaction represent the memory mode.

10. The memory device of claim 9, wherein the controller is a finite state machine (FSM).

11. The memory device of claim 9, wherein the memory device is an n-way set-associative cache, and the at least one sub-memory is at least one way of the memory device.

12. The memory device of claim 9, wherein each of the plurality of line mode bits is a valid bit representing whether a corresponding memory line among the plurality of memory lines is valid.

13. The memory device of claim 9, wherein the controller is configured to determine an access type of the transaction based on an address of the transaction.

14. An electronic system comprising:
at least one module;
the memory device of claim 10; and
a central processing unit (CPU) configured to control the at least one module and the memory device,
wherein, when the at least one sub-memory operates in a memory mode, the at least one sub-memory is used only for the at least one module.

15. A method of operating a memory device which includes a sub-memory, the method comprising:
receiving a mode change signal instructing the memory device to change an operation mode of the sub-memory from a cache mode to a memory mode, the cache mode being a mode in which the sub-memory functions as a cache of a main memory, the memory mode being a mode in which the sub-memory functions as a scratch-pad memory, the sub-memory storing cache data; and
changing, in response to the mode change signal, the operation mode of the sub-memory from the cache mode to the memory mode,
the operation mode being changed without flushing the cache data stored in the sub-memory to the main memory,
wherein the sub-memory includes,
an operation mode bit representing the operation mode of the sub-memory; and
a plurality of line mode bits representing operation modes of a plurality of memory lines, respectively, and
wherein the method further comprises:
when a transaction corresponding to one of the plurality of memory lines accesses the sub-memory,
operating the sub-memory in the cache mode when both of the operation mode bit and a line mode bit corresponding to the transaction represent the cache mode, and
operating the sub-memory in the memory mode when both of the operation mode bit and the line mode bit corresponding to the transaction represent the memory mode.

16. The method of claim 15 further comprising:
receiving a transaction identifying a location of the cache data while the operation mode of the sub-memory is set to the memory mode;
determining whether the transaction is a memory mode access transaction or a cache mode access transaction; and
when the transaction is a memory mode access transaction,
flushing the cache data stored in the sub-memory to the main memory.

17. The method of claim 15 further comprising:
operating the sub-memory as one way of N ways of an N-way set associative cache, when the operation mode is set to the cache mode.

18. The method of claim 15 further comprising:
operating the sub-memory as a memory space to which a memory working set of at least one of an application is mapped, when the operation mode is set to the memory mode.

\* \* \* \* \*